(12) United States Patent
Skarius et al.

(10) Patent No.: US 12,703,943 B2
(45) Date of Patent: Aug. 11, 2026

(54) DEVICE AND METHOD FOR TREATING GREEN LIQUOR

(71) Applicant: VALMET AB, Sundsvall (SE)

(72) Inventors: Johan Skarius, Hammarö (SE); Nicholas Rowe, Karlstad (SE)

(73) Assignee: VALMET AB, Sundsvall (SE)

( * ) Notice: Subject to any disclaimer, the term of this patent is extended or adjusted under 35 U.S.C. 154(b) by 182 days.

(21) Appl. No.: 18/552,537

(22) PCT Filed: Apr. 20, 2022

(86) PCT No.: PCT/SE2022/050384
§ 371 (c)(1),
(2) Date: Sep. 26, 2023

(87) PCT Pub. No.: WO2022/231500
PCT Pub. Date: Nov. 3, 2022

(65) Prior Publication Data

US 2024/0117566 A1 Apr. 11, 2024

(30) Foreign Application Priority Data

Apr. 26, 2021 (SE) .................................... 2150524-3

(51) Int. Cl.
*D21C 11/00* (2006.01)
*B01D 21/01* (2006.01)
*B01D 21/30* (2006.01)

(52) U.S. Cl.
CPC .......... *D21C 11/0078* (2013.01); *B01D 21/01* (2013.01); *B01D 21/305* (2013.01)

(58) Field of Classification Search
CPC .................................................. D21C 11/0078
(Continued)

(56) References Cited

U.S. PATENT DOCUMENTS 3,842,005 A * 10/1974 Moser .................. C02F 1/5263 162/29
2015/0197439 A1* 7/2015 Zou ....................... D21H 17/01 210/730

(Continued)

FOREIGN PATENT DOCUMENTS

EP 0 108 605 A2 5/1984
EP 0 479 569 A2 4/1992

(Continued)

OTHER PUBLICATIONS

Barra, O.V. and Espinoza, A.J., “Improvement of the green liquor clarification system and its effects on the operation of the causticizing plant and lime kiln”, In: Celulosa Y Papel, Jul./Aug. 2003, vol. 19, No. 3, pp. 14-18, ISSN 0716-2308 (with English machine translation of abstract).

(Continued)

*Primary Examiner* — Jacob T Minskey
(74) *Attorney, Agent, or Firm* — Foley & Lardner LLP

(57) ABSTRACT

The present invention relates to a method for treating green liquor in a green liquor treatment arrangement, wherein the method comprises—adding (101) a flocculation agent to green liquor to form flocculated green liquor, —supplying (102) the flocculated green liquor to a clarifying vessel for separating flocculated green liquor into flocculated matter and clear green liquor, —removing (103) flocculated matter through a sludge outlet, and—removing (104) clear green liquor from the clarifying vessel, wherein the method further comprises—measuring (201) a flocculation of the green liquor, wherein said measuring takes place after adding the flocculation agent but before supplying the flocculated green liquor to the clarifying vessel. The invention also relates to a green liquor treatment device.

8 Claims, 5 Drawing Sheets

Figure 1:
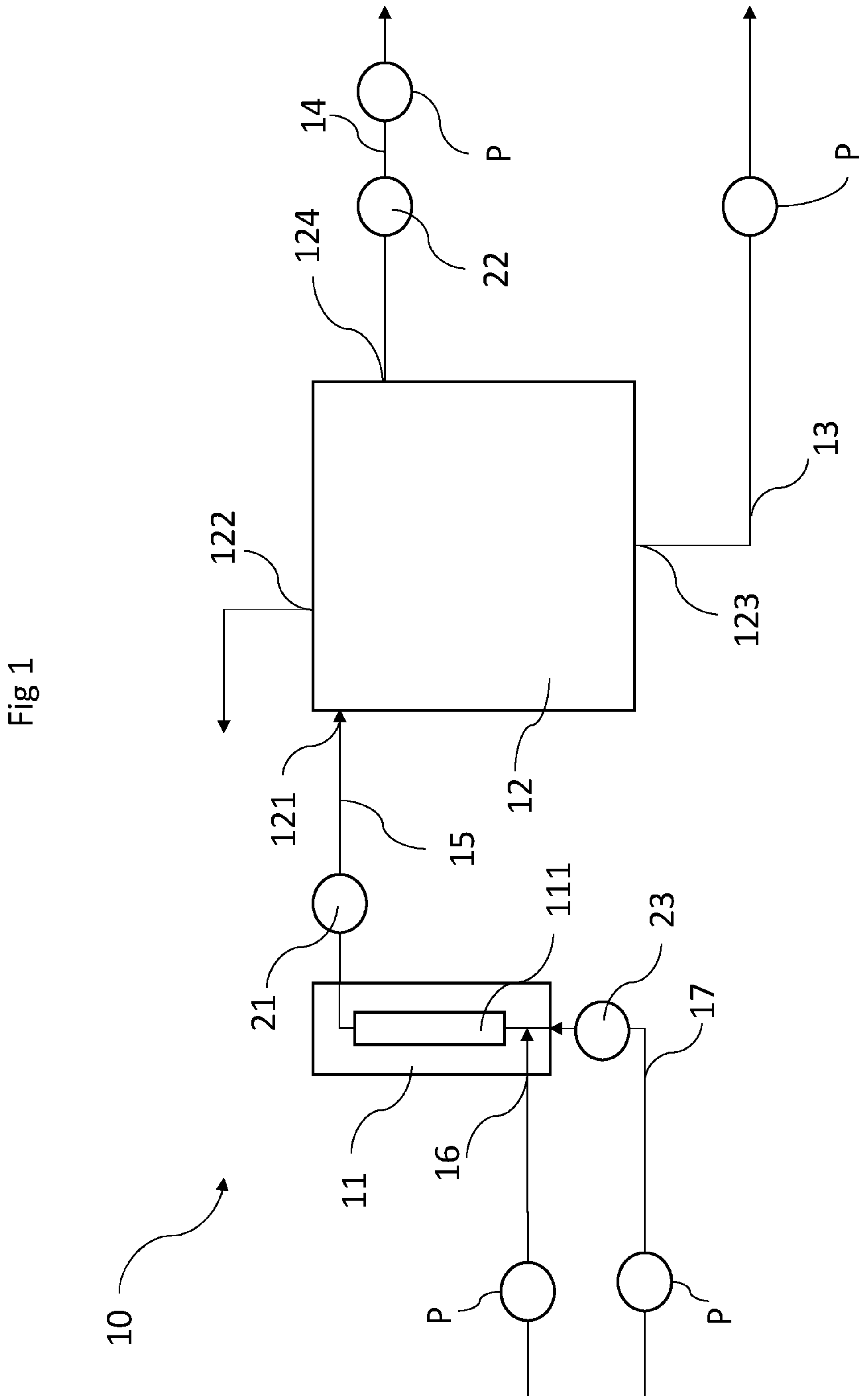

(58) Field of Classification Search
USPC .................................................... 162/30.11
See application file for complete search history.

(56) References Cited

U.S. PATENT DOCUMENTS

| | | | | |
|---|---|---|---|---|
| 2016/0122201 | A1* | 5/2016 | Gilmore | G01N 21/33<br>702/30 |
| 2020/0340179 | A1 | 10/2020 | Zhang et al. | |

FOREIGN PATENT DOCUMENTS

| | | | |
|---|---|---|---|
| JP | 2020-065964 | A | 4/2020 |
| WO | WO-99/40490 | A1 | 8/1999 |
| WO | WO-2015/075306 | A1 | 5/2015 |

OTHER PUBLICATIONS

International Search Report and Written Opinion of the International Searching Authority issued in the corresponding International Patent Application No. PCT/SE2022/050384, dated Jun. 1, 2022.
Swedish Search Report issued in connection with Sweden Appl. No. 2150524-3 dated Dec. 27, 2021.

* cited by examiner 10
11
111
12
121
122
123
124
13
14
15
16
17
21
22
23
P
P
P
P

10'
161
23
17
16
111
11
113
112
30
21
15
12
14
13
22

10''
161
16
17
11
21
15
12
13
14
22
23
30

101
201
102
104
103

DEVICE AND METHOD FOR TREATING GREEN LIQUOR

TECHNICAL FIELD

The present invention relates to a device and method for treating green liquor in a green liquor treatment arrangement, wherein the method comprises adding a flocculation agent to green liquor to form flocculated green liquor, supplying the flocculated green liquor to a clarifying vessel for separating flocculated green liquor into flocculated matter and clear green liquor, removing flocculated matter through a sludge outlet, and removing clear green liquor from the clarifying vessel.

BACKGROUND

Green liquor is a dissolved smelt of sodium carbonate, sodium sulfide and other compounds from the recovery boiler in the kraft process, and apart from these chemicals the green liquor also comprises insoluble compounds such as metal oxides, silicates, soot and other impurities.

A conventional method of green liquor purification utilizes a sedimentation technique, where the heavy particles, in the form of dregs, settle towards the bottom of large settling tanks known as clarifiers, using the density difference between the dregs and the green liquor. The overflow obtained from these clarifiers is the clarified green liquor, and the underflow (from bottom of the tank) contains the settled dregs content. However, these sedimentation tanks need to be quite large, and often integrated with a green liquor storage capacity of about twelve hours.

The efficiency of the sedimentation varies, however, depending among other things on fluctuations in the pulp production since this also causes variations in the flow of green liquor supplied to the clarifier. As a result, smaller particles in particular may remain in the green liquor even after passing the clarifier, and this decreases efficiency in downstream processes and increases the need for maintenance.

In order to resolve this, the clarifiers have been improved further by adding various flocculants to increase sedimentation rate, and often polymeric flocculants are used when production rate of clarified green liquor needs to be increased, or when a smaller less expensive settling tank is considered in new mill projects. However, even with added flocculants there is a risk that impurities remain and that quality of the green liquor after clarification is uneven. It would be highly advantageous to be able to resolve this problem and achieve a uniform green liquor with very low levels of particles.

There is therefore a need for improvements within this area.

SUMMARY

The object of the present invention is to eliminate or at least to minimize the problems discussed above. This is achieved by a device and method for treating green liquor according to the appended independent claims.

The method of the present invention comprises adding a flocculation agent to green liquor to form flocculated green liquor, supplying the flocculated green liquor to a clarifying vessel for separating flocculated green liquor into flocculated matter and clear green liquor, removing flocculated matter through a sludge outlet, and removing clear green liquor from the clarifying vessel. Furthermore, the method comprises measuring a flocculation of the green liquor, wherein said measuring takes place after adding the flocculation agent but before supplying the flocculated green liquor to the clarifying vessel.

It is advantageous to measure the flocculation of the green liquor before it is supplied to the clarifying vessel, since this may tell both whether the flocculation agent is able to cause the flocculation as desired and whether the flocculated green liquor has suitable properties for undergoing the separation in the clarifying vessel. If the flocculated green liquor still comprises particles that have not been affected by the flocculation agent, this may cause separation to be inefficient or to require more time than expected in order for the particles to sediment. Thus, by measuring the flocculation it may be determined whether the clear green liquor that is to be removed will actually be clear enough or whether subsequent treatment is needed.

Suitably, the method also comprises selecting a flocculation pre-treatment setpoint, determining a difference between a measured flocculation value and the flocculation pre-treatment setpoint, and adjusting an amount of flocculation agent to be added to the green liquor in response to said difference. Thereby, the flocculation of the green liquor may be adjusted as desired in order for the flocculated green liquor to be uniform over time, regardless of variations in the supply of green liquor. By thus being able to ensure that the flocculated green liquor is at or near the selected flocculation pre-treatment setpoint, the clarifying in the clarifying vessel may take place as desired and result in a clear green liquor that has a suitably low level of remaining particles.

Also, the method may comprise measuring a flocculation of the green liquor before adding the flocculation agent, determining a difference between a measured flocculation value before adding the flocculation agent and a measured flocculation value after adding the flocculation agent, and adjusting an amount of flocculation agent to be added to the green liquor in response to said difference. Thereby, the amount of flocculation agent to be added may be determined based on a property of the green liquor itself, in order to compensate for variations in the green liquor that is supplied.

Suitably, the method further comprises selecting a flocculation setpoint, measuring a flocculation of the clear green liquor after removal from the clarifying vessel, determining a difference between the measured flocculation of the clear green liquor and the flocculation setpoint, and adjusting an amount of the flocculation agent to be added to the green liquor based on said difference. Thereby, the supply of flocculation agent may be altered in order for the resulting clear green liquor to have desired properties.

The method may further comprise adjusting at least one parameter of the green liquor treatment arrangement based on said difference and/or based on the flocculation measurement after adding the flocculation agent. Thereby, operation of the green liquor treatment arrangement may be adjusted so as to bring the flocculation closer to the setpoint. Suitably, said at least one parameter is a rotational speed of a stirring device in a flocculation device, said flocculation device being a device in which the flocculation agent is added to the green liquor or to a device provided downstream of a point where flocculation agent is supplied, or both. Changing the stirring in the flocculation device makes it possible to achieve a more thorough mixing of the green liquor and the flocculation agent, or to decrease stirring in order to decrease mixing if flocculation is above the setpoint.

Suitably, the method comprises measuring the flocculation of the green liquor at predetermined intervals during operation of the green liquor treatment arrangement. Thereby, operation of the green liquor treatment arrangement may be monitored at desired intervals, to determine if the desired flocculation is achieved in order for the clear green liquor to have a suitably low level of remaining particles. The measuring at predetermined intervals may in some embodiments comprise measuring a predetermined number of times within a given interval or may alternatively comprise measuring once per selected time interval.

In some embodiments, the method may comprise measuring the flocculation of the green liquor continuously during operation of the green liquor treatment arrangement. Thereby, operation may be continuously monitored in order to detect variations as they occur.

The green liquor treatment arrangement of the invention comprises a clarifying vessel for separating flocculated green liquor into flocculated matter and clear green liquor, wherein said clarifying vessel comprises an inlet for input of flocculated green liquor, an outlet for removal of clarified green liquor, and a sedimentation outlet for removing flocculated matter. The green liquor treatment arrangement also comprises a flocculation device for receiving green liquor and adding a flocculation agent to form flocculated green liquor, an inlet conduit for transporting flocculated green liquor from the flocculation device to the inlet of the clarifying vessel, and a measuring device for measuring a flocculation. The measuring device is arranged to measure flocculation of the flocculated green liquor downstream of the flocculation device but upstream of the clarifying vessel.

The green liquor treatment arrangement achieves the main benefit of enabling a measuring of the flocculation after flocculation agent has been added but before clarifying.

Suitably, the measuring device is arranged to measure flocculation in the inlet conduit. Thereby, additional conduits are avoided, and measurements may take place in the flow of flocculated green liquor to the clarifying vessel. It is especially advantageous to be able to measure flocculation without requiring parallel conduits for guiding a quantity of liquor to a measurement device, since any removal of liquor for measurement purposes risks altering properties of the liquor during transport so that the measured flocculation is not representative of flocculation in the flow to the clarifying vessel.

Suitably, the green liquor treatment arrangement comprises a second measuring device that is arranged to measure flocculation downstream of the outlet of the clarifying vessel. Thereby, flocculation of the clear green liquor may also be measured to see if the clear green liquor is indeed clear and free from particles.

Also, the green liquor treatment arrangement may comprise a third measuring device, said third measuring device being arranged to measure flocculation in green liquor upstream of the flocculation device. Thereby, it is also possible to measure flocculation before the flocculation agent is added in order to ascertain a natural flocculation of the green liquor that may indicate to what degree an added flocculation agent is needed.

By combining the measurement from the measuring device with measurements from the second measuring device and/or the third measuring device, more in-depth knowledge of flocculation of the green liquor may be gathered so that the effect of adding the flocculation agent may be determined. This also shows whether more flocculation agent is needed in order for the clear green liquor to have a desired low level of flocculation.

Suitably, the flocculation device comprises a container having a green liquor inlet and a flocculated green liquor outlet, said flocculated green liquor outlet being operatively connected to the inlet conduit, and the flocculation device further comprising a flocculation agent inlet in the container for supplying the flocculation agent to the green liquor in the container. Thereby, flocculation agent is added in a convenient and reliable way, and the green liquor is mixed with the flocculation agent in the container so that the flocculated green liquor leaving the flocculation device is suitable for supplying to the clarifying vessel. A stirring device may be provided in the container for stirring the green liquor in order to increase mixing with the flocculation agent.

Optionally, the flocculation device may be a conduit having a flocculation agent inlet in a side wall of the conduit, said conduit further being connected at a downstream end to the inlet conduit. This is advantageous in avoiding the need for a separate container in which flocculation agent is added, and instead provides for a more compact green liquor treatment arrangement with fewer components. Suitably, the conduit of the flocculation device is integrated with the inlet conduit, and the measuring device is arranged to measure flocculation of the flocculated green liquor downstream of the flocculation agent inlet. Thereby, an even more compact green liquor treatment arrangement is achieved.

Suitably, the green liquor treatment arrangement also comprises a control unit that is operatively connected to the measuring device and to the flocculation device, wherein the control unit is configured to receive at least one measurement of the measuring device and to adjust a supply of flocculation agent into the flocculation device in response to said received at least one measurement. This is particularly advantageous in adjusting flocculation of the green liquor to reach any desired setpoint value, so that improved treatment of the green liquor is achieved.

The control unit is suitably operatively connected to at least one of the second measuring device and the third measuring device and configured to receive at least one measurement from the second and/or third measurement device. The control unit may also be configured to adjust a supply of flocculation agent into the flocculation device in response to said received at least one measurement. Thereby, flocculation of the green liquor may be monitored and compared so that resulting flocculation after addition of flocculation agent may be determined.

Furthermore, the control unit is suitably configured to control operation of a stirring device in the flocculation device. Thereby, mixing of the green liquor with the flocculation agent may be adjusted as desired.

The present invention also encompasses data processing means for carrying out the method, a computer program product comprising instructions for enabling a computer to carry out the method, and a computer-readable storage medium where such instructions may be stored.

Many additional benefits and advantages of the present invention will be readily understood by the skilled person in view of the detailed description below.

DRAWINGS

Figure 2:
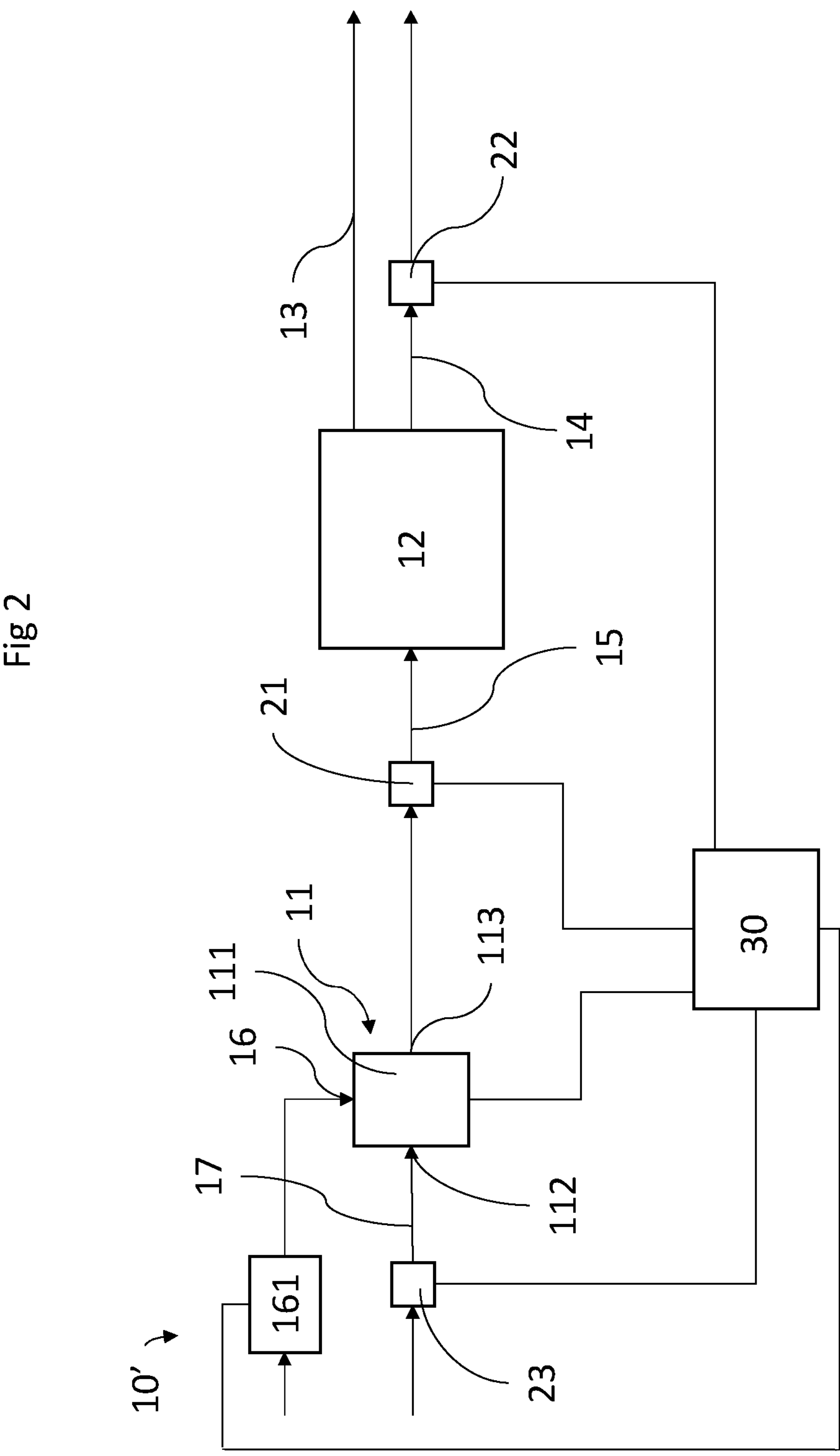
Figure 3:
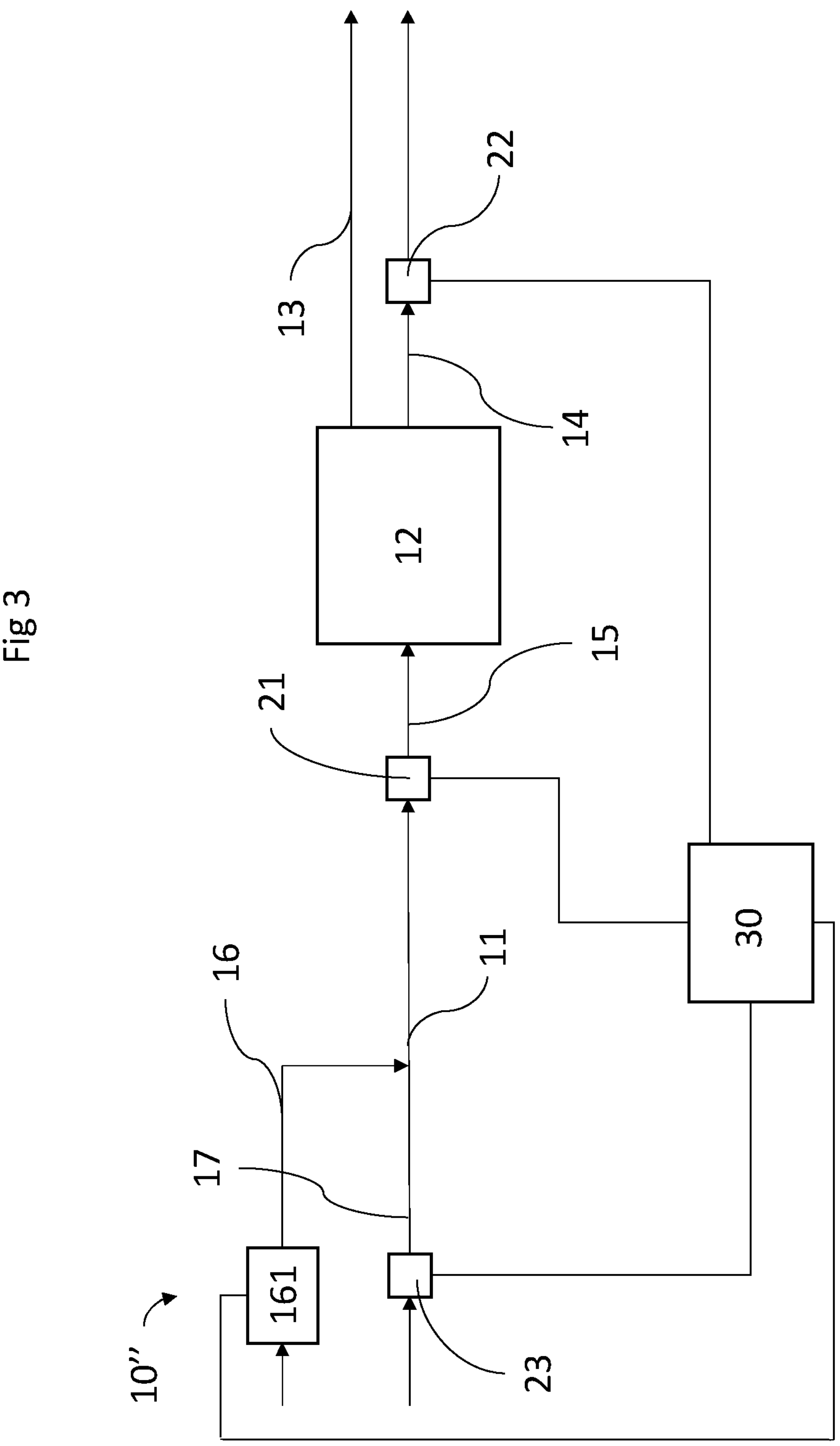
Figure 4:
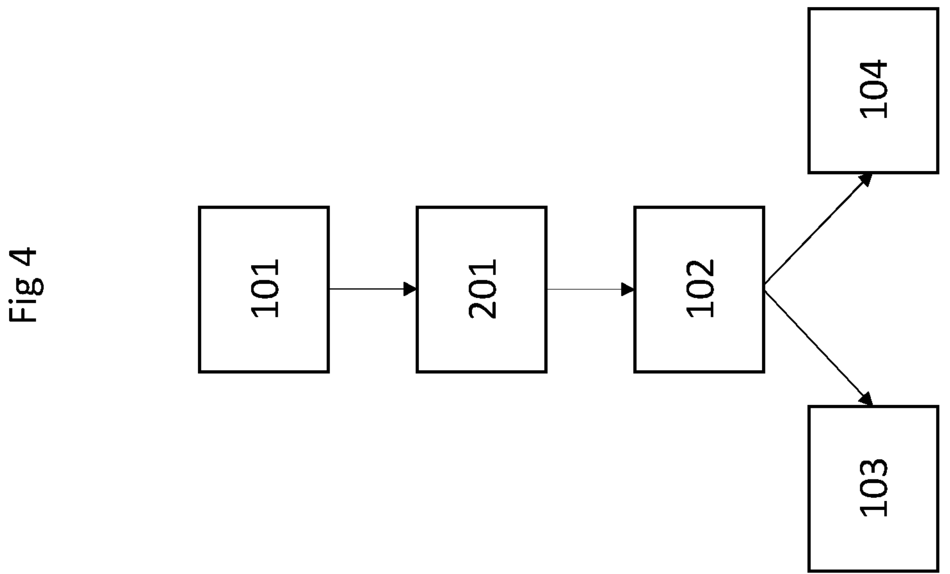
Figure 6:
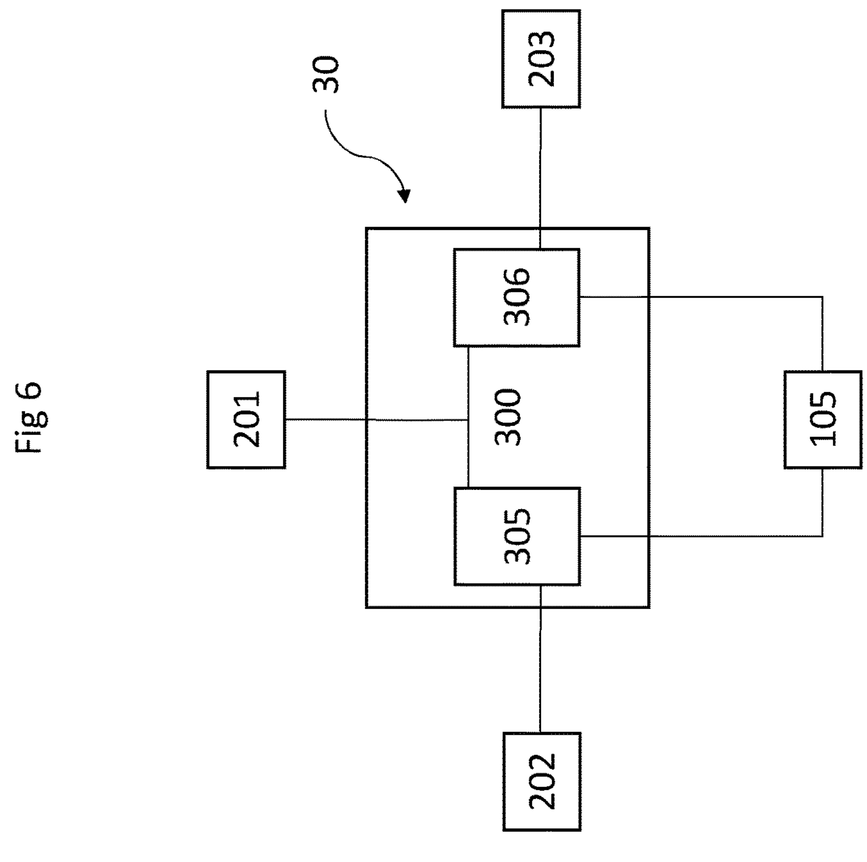
Figure 5:
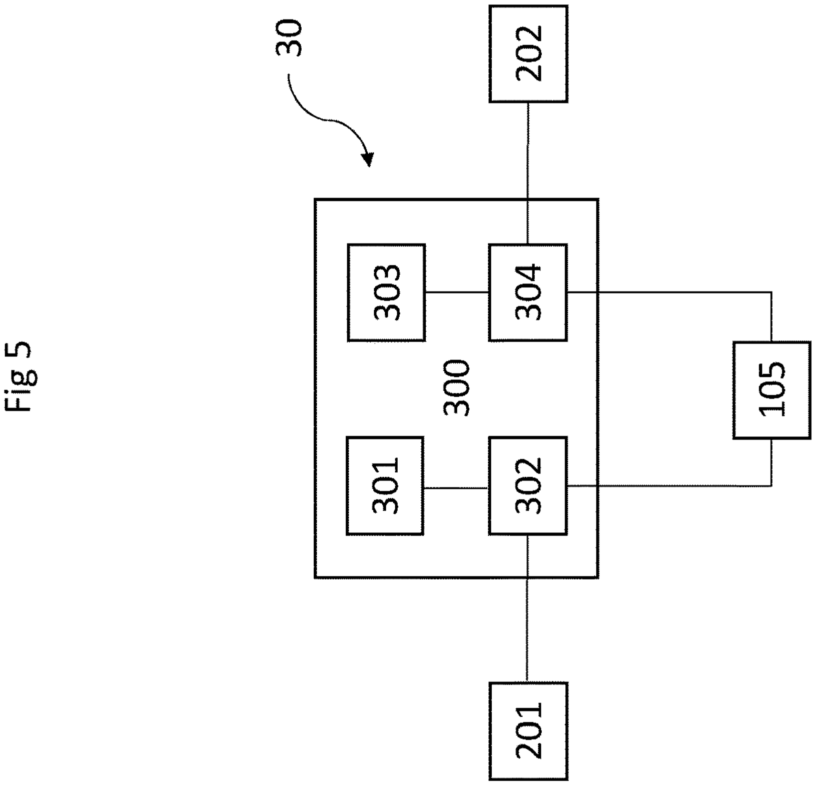

The invention will now be described in more detail with reference to the appended drawings, wherein FIG. 1 discloses a green liquor treatment arrangement according to a first embodiment of the invention;

FIG. 2 discloses schematically the green liquor treatment arrangement according to a second embodiment;

FIG. 3 discloses schematically the green liquor treatment arrangement according to a third embodiment;

FIG. 4 discloses a method for treating green liquor according to the invention;

FIG. 5 discloses another embodiment of the method according to the invention; and FIG. 6 discloses yet another embodiment of the method according to the invention.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

A green liquor treatment arrangement 10, 10', 10" according to the invention will now be described in more detail, followed by a description of a method for treating green liquor according to the invention.

When in the following the term "operatively connected" is used, this is to be understood as a connection that enables one component to communicate with another by sending and receiving signals, or alternatively as a connection that allows a medium to pass from one component to the other or as one component being connected to the other in such a way that it may control operation of the other.

Generation and use of green liquor is well known, particularly within the field of pulp production. The need for treating green liquor to remove particles or solid matter is also well known, and this will therefore not be described in detail below. Instead, the treatment arrangement and method according to the invention will be described, with particular emphasis on differences and advantages of the present invention in relation to known solutions for treating green liquor.

FIG. 1 discloses the green liquor treatment arrangement 10 according to a first embodiment of the invention, comprising a first conduit 17 for transporting green liquor into the green liquor treatment arrangement 10 to a flocculation device 11 where the green liquor is mixed with a flocculation agent. The flocculation agent itself is added to the green liquor in a flocculation inlet 16 that may supply the flocculation agent to the first conduit 17 or directly into the flocculation device 11, either into a container 11 of the flocculation device 11 or into a continuation of the first conduit 17 inside the flocculation device 11. When green liquor is mixed with the flocculation agent, a flocculated green liquor is formed. From the flocculation device 11, the flocculated green liquor passes through an inlet conduit 15 to an inlet 121 into a clarifying vessel 12 where flocculated matter is removed from the flocculated green liquor through sedimentation. From the clarifying vessel, flocculated matter is removed through a sludge outlet 123 and transported in a sludge conduit 13 from the green liquor treatment arrangement 10. Clear green liquor, i.e. flocculated green liquor from which flocculated matter has been removed, is itself removed from the clarifying vessel 12 through an outlet 124 for removing clear green liquor, and is transported in a clear green liquor conduit 14 from the green liquor treatment arrangement 10. The clarifying vessel also comprises a gas outlet 122 for allowing gas to escape during sedimentation. A plurality of pumps P are also suitably provided for pumping liquor and flocculation agent into and through the green liquor treatment arrangement 10 and said pumps P may suitably be arranged in or along each of the conduits for transporting green liquor, sludge and flocculation agent.

Also provided in the green liquor treatment arrangement 10 are at least a first measuring device 21 that is configured to measure a property of the flocculated green liquor between the flocculation device 11 and the clarifying device 12. Suitably, at least one of a second measuring device 22, configured to measure a property of the clear green liquor, and a third measuring device 23 configured to measure a property of green liquor before addition of flocculation agent, are also provided.

Each of the measuring devices 21, 22, 23 are configured to measure a property of the green liquor, flocculated green liquor, or clear green liquor. In some embodiments, this is achieved through the measuring devices 21, 22, 23 being arranged in connection with a conduit in which the liquor is transported and the measurement takes place by the measuring devices 21, 22, 23 being able to measure inside the conduit. This may take place by the measuring devices 21, 22, 23 being placed inside the conduits, but may alternatively take place by a sensor of the measuring devices 21, 22, 23 being introduced into the conduit for the purpose of measuring or alternatively being permanently placed in the conduit. In other embodiments, the measuring devices 21, 22, 23, are arranged to measure through a wall or opening of the conduit. The measuring devices 21, 22, 23 may be placed at least partly in a wall of the conduit. Alternatively, in some embodiments liquor may be removed from the conduits and the measuring devices 21, 22, 23 may be configured to perform a measurement on removed liquor instead of on liquor that currently passes along the conduits. Also, in some embodiments only one measuring device 21 may be provided for performing measurements on liquor removed from the conduits both upstream of the flocculation device 11, downstream of the flocculation device 11 but upstream of the clarifying device 12, and downstream of the clarifying device 12. When in the following a first measuring device 21, a second measuring device 22 and a third measuring device 23 are mentioned and described, this is to be understood as a measuring device that is configured to perform a measurement on liquor at, in connection with, or taken from the conduits at these parts of the green liquor treatment arrangement 10.

The property that is measured by the measuring devices is a flocculation or a property that is indicative of a flocculation of the flocculated green liquor. This may be measured in different ways, but in the preferred embodiment a flocculation sensor is used to measure permeability of the flocculated green liquor to light. Other ways of measuring flocculation are also known and may alternatively be used with the present invention. A flocculation ratio may be determined as a ratio of a permeability of light in flocculated green liquor in relation to a permeability of light in green liquor before addition of flocculation agent. For a permeability of 100 in green liquor before addition of flocculation agent, a good quality of flocculation is where the permeability is at least 200, preferably at least 250 or even more preferably at least 300. This gives a flocculation ratio of at least 2, preferably at least 2.5 and more preferably at least 3.

When measuring flocculation or a parameter indicative of flocculation in the green liquor upstream of the addition of flocculation agent, this is to be understood as measuring a natural flocculation or a prevalence of particles and solid matter in the green liquor. By thus determining a flocculation before actual flocculation due to the flocculation agent occurs, it is rendered possible to ascertain the effect that the flocculation agent has had on the green liquor.

When the term "upstream" and "downstream" are used herein, this is to be understood in relation to the liquor passing through the green liquor treatment arrangement 10. Thus, describing one component as upstream of another means that a quantity of green liquor passes the upstream component before arriving at the downstream component.

Operation of the clarifying vessel 12 will not be described in detail herein, suffice it to say that the clarifying vessel 12 is configured to separate flocculated matter from the liquor so that a clear green liquor is achieved. The flocculated matter comprises particles, solid matter and other impurities that form larger groups or clusters of impurities by the flocculation agent acting to connect the impurities to each other in order to facilitate sedimentation. The flocculation agent may be a polymeric substance such as is manufactured by Kemira, by Nalco or by Kurita. Such substances are well known within the art and it is particularly to be noted that the present invention is not limited by any particular flocculation agent or group of flocculation agents. Rather, the present invention is focused towards measuring and controlling flocculation of green liquor using any kind of suitable flocculation agent.

It is advantageous to supply the flocculation agent to the green liquor upstream of a container 111 of the flocculation device 11 since this allows for a mixing of the flocculation agent and the green liquor to start before the green liquor is inserted into the container 11. This decreases the requirement of mixing through stirring devices and the like so that a thorough mixing is achieved to form the flocculated green liquor.

FIG. 2 discloses a second embodiment of the green liquor treatment arrangement 10', and components that are identical or similar to the first embodiment are denoted by the same reference numerals. In the second embodiment, a control unit 30 is shown and is operatively connected to the first measuring device 21, the second measuring device 22, the third measuring device 23, the flocculation device 11, and to a valve 161 provided in a conduit connected to the flocculation inlet 16 such that the valve 161 is configured to control a flow of flocculation agent to the flocculation inlet 16. In FIG. 2 and also in FIG. 3 described below, the control unit 30 is shown as directly connected to the other components of the green liquor treatment arrangement 10', but it is to be noted that the control unit 30 may be operatively connected through wires or in wireless connections using transmitters and receivers, as desired.

The second embodiment of the green liquor treatment arrangement 10' differs from the first embodiment described above mainly in the flocculation device 10 being shown as a container 111 into which the flocculation agent is supplied directly through the flocculation inlet 16. The flocculation device suitably also comprises a stirring device (not shown) that acts to mix the green liquor with the flocculation agent. Also, the container 111 comprises a green liquor inlet 112 through which green liquor is supplied to the container 111, and further comprises a flocculated green liquor outlet 113 for emptying flocculated green liquor out into the inlet conduit 15 connected to the clarifying vessel 12.

It is advantageous to provide the flocculation device 11 as a container in which the flocculation agent and the green liquor is mixed, since this ensures a thorough mixing so that flocculation of the green liquor is improved. It is also advantageous to supply the flocculation agent directly into the container 111 of the flocculation device 11 since this allows for a greater control of the flocculation.

FIG. 3 discloses the third embodiment 10" that differs from the first and second embodiments by the flocculation device 11 being integrated with the inlet conduit 15 so that flocculation agent 16 is supplied to the inlet conduit 15 and the green liquor is mixed with the flocculation agent as it passes along the inlet conduit 15 to the clarifying vessel 12. Alternatively, the flocculation device 11 forms a separate conduit that at its downstream end is connected to the inlet conduit 15 and at its upstream end is connected to the first conduit 17.

This is advantageous in providing a green liquor treatment arrangement 10" with fewer components and where mixing of the green liquor and flocculation agent may take place without using separate mixing devices such as a container or a stirring device. Instead, the flow of green liquor in the inlet conduit 15 causes the flocculation agent to be gradually mixed with the green liquor as they pass along the inlet conduit 15 and into the clarifying vessel 12. In the third embodiment, the measuring device 21 is configured to measure flocculation in the inlet conduit 15. The inlet conduit 15 may be straight or may optionally include at least one bend, where flocculation is increased due to turbulence caused when the green liquor is forced to change its direction of movement due to the conduit bending. By providing such bends at suitable intervals flocculation may be increased in the inlet conduit 15.

A main advantage of the present invention in all the embodiments described herein in providing the measuring device 21 to measure flocculation of the flocculated green liquor downstream of the flocculation device 11. Thereby, flocculation of the flocculated green liquor before entering the clarifying vessel 12 is known. This has a number of benefits, ranging from establishing this property of the flocculated green liquor before sedimentation starts to controlling operation of the green liquor treatment arrangement 10, 10', 10" in response to this measurement to improve operation and to improve quality of the clear green liquor since a larger fraction of available impurities may be removed by ensuring that flocculation is satisfactory before dregs are removed.

The measuring device 21, and suitably also the second measuring device 22 and/or the third measuring device 23, may be configured to measure flocculation continuously in order to monitor flocculation of the green liquor. This has the benefit of detecting variations in quality of the green liquor and also variations in the flow of green liquor into the green liquor treatment arrangement 10, 10', 10" so that such variations may be stored or displayed. Alternatively, the monitoring of the flocculation may be used by the control unit 30 to continuously or at predetermined intervals adjust the flow of flocculation agent into the flocculation device 11 so that the flocculation of the green liquor may be held at a desired level regardless of the variations in the quality and supply of green liquor. In other embodiments, flocculation may be measured at predetermined intervals, such as once per hour or once every ten minutes. Measuring at predetermined intervals also includes randomized measurements where a predetermined number of measurements take place within a given time interval such as five measurements per day or twice per hour. The measurements, whether continuous or at intervals, may be stored by the control unit 30 and may be displayed to a user or used in presenting data relating to operation of the green liquor treatment arrangement 10, 10', 10". Also, the control unit 30 may be configured to adjust operation of the green liquor treatment arrangement 10, 10', 10" in response to the measurements such as increasing or decreasing the supply of flocculation agent or altering a parameter of the flocculation device 11 such as stirring by a stirring device in order to ensure more or less mixing of the green liquor with the flocculation agent.

In the following, the method for treating green liquor in a green liquor treatment arrangement will be described in detail with reference to the green liquor treatment arrangement shown in FIG. 1-3 and to the method shown in FIG. 4-6.

FIG. 4 discloses a first embodiment of the inventive method, comprising adding 101 the flocculation agent to green liquor to form flocculated green liquor. The flocculation of the flocculated green liquor is measured 201 after the flocculation agent is added, before supplying 102 the flocculated green liquor to the clarifying vessel 12 in which the flocculated green liquor is separated into flocculated matter, i.e. dregs, and clear green liquor. The flocculated matter is removed 103 through the sludge outlet 123 and the clear green liquor is removed 104 through an outlet 124.

As also stated above, it is highly advantageous to be able to measure the flocculation after flocculation agent is added but before the flocculated green liquor is treated in the clarifying vessel 12 since this makes it possible to determine what effect the flocculation agent has had on the green liquor when they are mixed.

FIG. 5 discloses one advantageous embodiment of the invention, which comprises the measuring 201 of flocculation by the measuring device 21 and feeding the measurement to processing circuitry 300 of the control unit 30. A flocculation pre-treatment setpoint is selected 301, either by input by a user or by the processing circuitry 300 performing a selection based on previously used setpoints, previous measurement, or other suitable parameters. The flocculation pre-treatment setpoint is a desired value of flocculation for the flocculated green liquor before entering the clarifying vessel 12.

A difference between the measured flocculation value from the measuring device 21 and the flocculation pre-treatment setpoint is determined 302, and based on this difference the processing circuitry is configured to adjust 105 an amount of flocculation agent to be added to the green liquor. Thus, if a measured flocculation is below the flocculation pre-treatment setpoint, adjusting 105 the amount of flocculation agent would mean increasing the supply of flocculation agent to the green liquor in order to increase flocculation in the flocculation device 11. In the embodiments shown in FIG. 2 and FIG. 3, such increase could be achieved e.g. by the control unit 30 operating the valve 161 so that flow rate of the flocculation agent is increased. In other embodiments, the increase could be achieved in other ways as long as the supply of flocculation agent into the flocculation device 11 is altered.

If the measured flocculation is instead above the flocculation pre-treatment setpoint, adjusting 105 the amount of flocculation agent would mean decreasing the supply of flocculation agent to the green liquor in order to decrease flocculation in the flocculation device 11. This decrease could be achieved in the embodiments shown in FIG. 2 and FIG. 3 e.g. by the control unit 30 operating the valve 161 so that the flow rate of the flocculation agent is decreased.

Alternatively, adjusting 105 the amount of flocculation agent could mean giving a recommendation or an instruction for increasing or decreasing the flow of flocculation agent to a human operator, who could affect such adjustment manually.

In some embodiments, determining 302 the difference between the measured flocculation and the flocculation pre-treatment setpoint could also or instead comprise using a plurality of measurements and determine a rate of change of the flocculation over time, in order to both determine a desired adjustment of the supply of flocculation agent to bring the flocculation closer to the flocculation pre-treatment setpoint and also to evaluate a result of previous alterations to the supply of flocculation agent. The flocculation pre-treatment setpoint could in such embodiments comprise both a desired value and a desired rate of change of the flocculation, such that e.g. a larger quantity of flocculation agent is to be supplied when the calculated rate of change based on the measurements is large, since this is indicative of a sudden change in the quality of green liquor or in the supply of green liquor to the green liquor treatment arrangement 10, 10', 10" so that the addition of flocculation agent is suddenly rendered insufficient in view of these sudden changes. Also, where the rate of change is lower, a smaller change in the supply of flocculation agent could be sufficient to keep the flocculation close to the flocculation pre-treatment setpoint.

This embodiment also suitably comprises selecting 303 a flocculation setpoint corresponding to a desired flocculation in the clear green liquor after removal from the clarifying vessel 12. This desired flocculation should be very low to indicate that the clear green liquor should have a very low content of flocculated matter after sedimentation in the clarifying vessel 12. Also, this embodiment comprises measuring 202 of flocculation by the second measuring device 22, i.e. of the clear green liquor, and determining 304 a difference between the measured flocculation of the clear green liquor and the flocculation setpoint. Based on this difference, the amount of the flocculation agent to be added to the green liquor is adjusted 105. The flocculation setpoint is indicative of the amount of impurities still present in the clear green liquor after treatment in the clarifying vessel 12, and these impurities may be gathered in the form of flocculated clusters of particles or may alternatively comprise impurities that have not been affected by the flocculation agent and are therefore present as particles or smaller matter that does not form clusters.

By comparing the measured flocculation in the clear green liquor with the flocculation setpoint, the operation of the green liquor treatment arrangement 10, 10', 10" can be evaluated to determine if sufficient amounts of flocculated matter are removed by the clarifying vessel 12. If the measured flocculation is higher than the flocculation setpoint, the amount of flocculation agent can be increased so that the flocculated green liquor comprises a larger amount of flocculated matter, since flocculated matter is more easily removed in the clarifying vessel 12 due to their combined weight. If the measured flocculation is instead lower than the flocculation setpoint, it would be possible to decrease the supply of flocculation agent to the green liquor, but alternatively no action need to be taken since the low amount of solid particles and impurities in the green liquor signifies that the quality of the clear green liquor is high enough.

Selecting the flocculation setpoint may take place in the same way as selecting the flocculation pre-treatment setpoint or may alternatively take place in another way. Similar to the discussions above regarding the flocculation pre-treatment setpoint, a plurality of measurements may be used to achieve a rate of change and this may be used in similar ways as described above.

FIG. 6 discloses another embodiment of the invention, in which the processing circuitry 300 is further configured to use measuring 203 by the third measuring device 23 of the green liquor before flocculation agent is added and determining 306 a difference between this measured flocculation with the flocculation measured 201 by the measuring device 21 of the flocculated green liquor after the flocculation agent is added. Based on this difference, the amount of flocculation agent may be adjusted 105.

By measuring the flocculation before adding the flocculation agent, this comparison will give information of an increase of flocculation caused by addition of the flocculation agent. The processing circuitry 300 is suitably configured to comprise information of a suitable difference between these measured values, or alternatively to determine how large this difference should be. If the difference is determined to be too small, an increase in the supply of flocculation agent may take place, or conversely if the difference is determined to be too large the supply of flocculation agent may be decreased. Alternatively, the processing circuitry 300 may be configured to make no adjustment at all of the supply of flocculation agent if the difference is above a given threshold. Similar to the reasoning above, a rate of change may be used instead of a value.

The ways described above for adjusting the flow of flocculation agent by the control unit 30 or a human operator controlling the valve 161 or another device that determines supply of the flocculation agent may be used for any situation described herein in which supply of flocculation agent is to be changed.

Also, the processing circuitry 300 may be configured to use measuring 201 by the measuring device 21 of flocculation in the flocculated green liquor and determine 305 a difference between this and a measured 202 flocculation by the second measuring device 22 in the clear green liquor. Based on the determined difference, the supply of flocculation agent may be adjusted 105.

The processing circuitry 300 may also be configured to adjust a parameter of the green liquor treatment arrangement 10, 10', 10" based on any of these determined differences mentioned above or based on the flocculation measurement of the measuring device 21. This parameter may suitably be a rotational speed of the stirring device in the flocculation device 11, but alternatively the parameter may be any other parameter of the green liquor treatment arrangement 10, 10', 10" that affects operation.

The processing circuitry 300 may be configured to measure flocculation by any of the measuring devices 21, 22, 23 at predetermined intervals, or at randomized intervals in a given time. Alternatively, measurements may take place continuously.

Although embodiments of the invention described above with reference to FIG. 1-6 comprise a control unit 30 that in turn comprises processing circuitry 300, and processes performed in at least one processor, the invention also extends to computer programs, particularly computer programs on or in a carrier, adapted for putting the invention into practice. The programs may be in the form of source code, object code, a code intermediate source and object code such as in partially compiled form, comprise software or firmware, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

In one or more embodiments, there may be provided a computer program loadable into a memory communicatively connected or coupled to at least one data processor, e.g. control unit 30, comprising software or hardware for executing the method according any of the embodiments herein when the program is run on the at least one data processor.

In one or more further embodiment, there may be provided a processor-readable medium, having a program recorded thereon, where the program is to make at least one data processor, e.g. the control unit 30, execute the method according to of any of the embodiments herein when the program is loaded into the at least one data processor.

It is to be noted that features from the various embodiments described herein may freely be combined, unless it is explicitly stated that such a combination would be unsuitable.

The invention claimed is:

1. A method for treating green liquor in a green liquor treatment arrangement, the method comprising:

providing the green liquor treatment arrangement, which comprises:
- a flocculation device,
- a clarifying vessel,
- an inlet conduit that extends from the flocculation device to the clarifying vessel, and
- a first flocculation measuring device located directly in a path of the inlet conduit that extends from the flocculation device to the clarifying vessel;

in the flocculation device, adding a flocculation agent to green liquor to form flocculated green liquor;

after adding the flocculation agent, supplying the flocculated green liquor from the flocculation device to the clarifying vessel via the inlet conduit;

measuring, with the first flocculation measuring device, a flocculation of the flocculated green liquor that is flowing in the inlet conduit from the flocculation device to the clarifying vessel, in the clarifying vessel, separating the flocculated green liquor into flocculated matter and clear green liquor;

removing the flocculated matter through a sludge outlet; and removing the clear green liquor from the clarifying vessel.

2. The method according to claim 1, further comprising:

selecting a flocculation pre-treatment setpoint;

determining a difference between a measured flocculation value and the flocculation pre-treatment setpoint; and adjusting an amount of the flocculation agent added to the green liquor based on said difference.

3. The method according to claim 1, further comprising:

before adding the flocculation agent, measuring a flocculation of the green liquor using the first flocculation measuring device;

determining a difference between a measured flocculation value before adding the flocculation agent and a measured flocculation value after adding the flocculation agent; and adjusting an amount of the flocculation agent added to the green liquor based on said difference.

4. The method according to claim 1, wherein:

the green liquor treatment arrangement further comprises:

a clear green liquor conduit extending from an outlet of the clarifying vessel, and a second flocculation measuring device located directly in a path of the clear green liquor conduit that extends from the outlet of the clarifying vessel; and the method further comprises:

selecting a flocculation setpoint;

after removing the clear green liquor from the clarifying vessel, measuring, with the second flocculation measuring device, a flocculation of the clear green liquor that is flowing in the clear green liquor conduit from the outlet of the clarifying vessel;

determining a difference between the measured flocculation of the clear green liquor and the flocculation setpoint; and adjusting an amount of the flocculation agent added to the green liquor based on said difference.

5. The method according to claim 2, further comprising: adjusting at least one parameter of the green liquor treatment arrangement based on said difference and/or based on the flocculation measurement after adding the flocculation agent.

6. The method according to claim 5, wherein said at least one parameter is a rotational speed of a stirring device in the flocculation device.

7. The method according to claim 1, comprising measuring, using the first flocculation measuring device, the flocculation of the green liquor at predetermined intervals during operation of the green liquor treatment arrangement.

8. The method according to claim 1, comprising measuring, using the first flocculation measuring device, the flocculation of the flocculated green liquor continuously during operation of the green liquor treatment arrangement.

* * * * *